Jan. 25, 1927.

A. KAPITOWITZ

OIL GAUGE FOR MOTORS

Filed Oct. 16, 1924.

1,615,762

WITNESSES:

INVENTOR
Aaron Kapitowitz.
BY
ATTORNEYS.

Patented Jan. 25, 1927.

1,615,762

UNITED STATES PATENT OFFICE.

AARON KAPITOWITZ, OF STEVENSVILLE, NEW YORK.

OIL GAUGE FOR MOTORS.

Application filed October 16, 1924. Serial No. 744,020.

The present invention relates to new and useful improvements in indicators for liquid level, and it pertains more particularly to a device for indicating the level of lubricant in the crank case of an automobile motor.

It is one of the objects of the invention to provide a device of this character which may be adapted to an internal combustion motor without necessitating any changes in the motor construction.

It is a further object of the invention to provide a device of this character which is supported by the motor on the exterior thereof and has direct communication with the oil sump of the motor.

It is a further object of the invention to construct the device in such a manner that the same may be applied without the use of special tools for the purpose.

With the above and other objects in view, reference is had to the accompanying drawings, in which—

Figure 1:
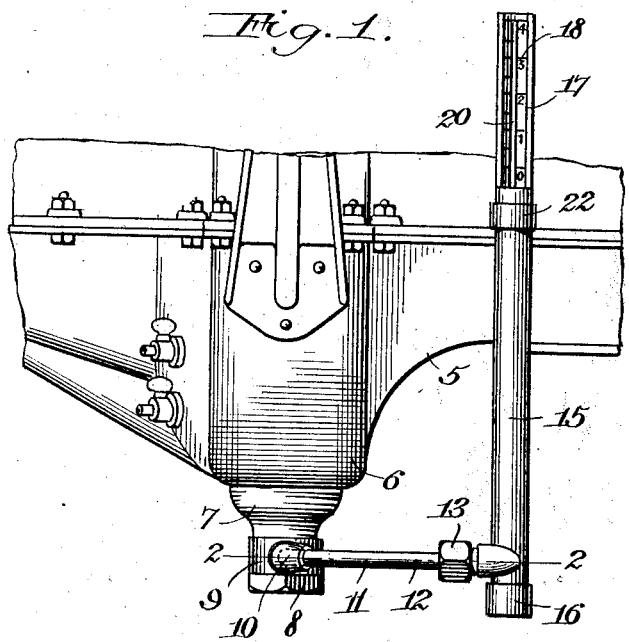
Figure 1 is a view in elevation of a portion of the motor showing a level indicator constructed in accordance with the present invention in position thereon.
Figure 2:
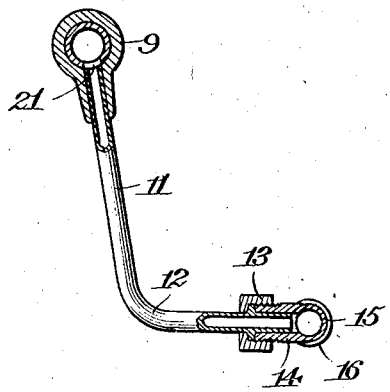
Fig. 2 is a detail horizontal sectional view taken on the line 2—2 of Fig. 1.

Referring more particularly to the drawings, the reference numeral 5 designates a motor crank case, 6 designates the sump, and 7 designates the drain thereof. In common construction the drain is closed by means of a screw plug 8.

Figure 4:
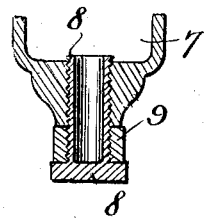
Fig. 4 is a detail sectional view showing the manner in which the indicator is attached to the outer sump of the motor.

In carrying out the present invention a collar or the like, 9, is adapted to surround the screw plug 8 closing the drain opening of the sump 7, as shown in Fig. 4. Connected to this collar 9, as at 10, there is a pipe 11, which is bent as at 12. The end of this pipe is connected by means of a coupling 13 to an elbow extension 14 of a vertically disposed pipe or column 15. The lower end of this vertically disposed pipe or column 15 is closed by a cap 16, and the upper end cut away as at 17 and provided with a plurality of graduations 18. Mounted within the vertical pipe or column 15, there is a float 19, and carried by said float 19 and projecting vertically therefrom, there is a rod 20, which rod serves as a pointer when operating in conjuction with the graduations 18.

The device operates in the following manner: With the parts in the position shown in Fig. 1, the oil will rise in the pipe or column 15 to a level corresponding to the level in the crank case 5 or oil sump 6. The float 19 will rise and be carried by the oil upon this level, with the rod 20 registering upon the graduations 18, the quantity of oil within the crank case 5. As the oil becomes consumed, the float will lower and, consequently, a corresponding lower reading will be had.

Figure 3:
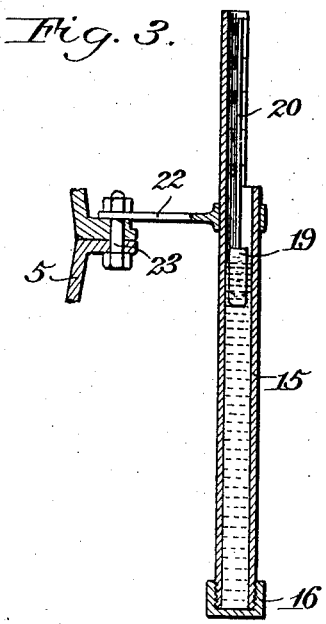
Fig. 3 is a vertical sectional view of the column of the indicator.

It is understood that the screw plug 8 which closes the drain opening of the sump 7 is provided with an opening 21 adapted to register with the pipe 11 in order that the oil in the crank case may pass through the pipe 11 to the vertical pipe or column 15. The pipe or column 15 is provided near its upper end with a bracket 22, and such bracket 22 is secured to one of the bolts 23 securing the crank case 5 to the motor block. This construction is shown in Fig. 3, and it is employed in order to give rigidity to and aid in supporting the pipe or column 15.

From the foregoing it is apparent that all of the objects of the present invention have been accomplished, and, further, it should be understood that numerous modifications of structure might readily be resorted to without in the least departing from the scope of the claim.

What is claimed is:

An oil gauge comprising a float chamber, said float chamber being cut away to present an upper end portion, said upper end portion having calibrations on the inside thereof, a removable cap closing the lower end of the float chamber, a pipe detachably connected with said float chamber, the passage in said pipe being in communication with the interior of the float chamber, an annular member having a hole which receives one end of the pipe, a hollow plug having an aperture in a portion thereof, the portion of said plug having the aperture therein fitting in said annular member, the aperture in registration with the hole in the annular member and the passage in said pipe, a float movable in said float chamber, and an indicating rod on said float which moves with respect to said calibrations as the float moves up and down.

AARON KAPITOWITZ.